(12) United States Patent
Cho (10) Patent No.: US 12,162,531 B1
(45) Date of Patent: Dec. 10, 2024

(54) VEHICLE STEERING DEVICE

(71) Applicant: HL MANDO CORPORATION, Gyeonggi-do (KR)

(72) Inventor: Hanbin Cho, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 18/427,807

(22) Filed: Jan. 30, 2024

(30) Foreign Application Priority Data

Jun. 9, 2023 (KR) .................. 10-2023-0074146

(51) Int. Cl.
*B62D 1/187* (2006.01)

(52) U.S. Cl.
CPC .................. *B62D 1/187* (2013.01)

(58) Field of Classification Search
CPC .................. B62D 1/187; B62D 1/184
See application file for complete search history.

(56) References Cited

U.S. PATENT DOCUMENTS

| | | | | |
|---|---|---|---|---|
| 10,676,122 B2* | 6/2020 | Kwon | ............ | B62D 1/187 |
| 11,285,990 B2* | 3/2022 | Higuchi | ............ | B62D 1/184 |
| 11,312,407 B2* | 4/2022 | Kwon | ............ | B62D 1/185 |
| 11,345,389 B2* | 5/2022 | Buzzard | ............ | B62D 1/184 |
| 11,577,773 B2* | 2/2023 | Ko | ............ | B62D 1/184 |
| 11,597,425 B2* | 3/2023 | Wu | ............ | B62D 1/184 |
| 11,866,089 B1* | 1/2024 | Wen | ............ | B62D 1/184 |
| 11,866,092 B1* | 1/2024 | Su | ............ | B62D 1/184 |
| 11,945,494 B2* | 4/2024 | Kwon | ............ | B62D 1/184 |
| 2019/0202488 A1* | 7/2019 | Lee | ............ | B62D 1/195 |
| 2020/0180676 A1* | 6/2020 | Kwon | ............ | B62D 1/185 |

FOREIGN PATENT DOCUMENTS

| | | | |
|---|---|---|---|
| KR | 10-2013-0056122 | 5/2013 | |
| KR | 10-2014-0053641 | 5/2014 | |
| KR | 10-2017-0117765 | 10/2017 | |
| WO | WO-2021049821 A1 * | 3/2021 | ............ B62D 1/181 |

* cited by examiner

*Primary Examiner* — Faye M Fleming
(74) *Attorney, Agent, or Firm* — Womble Bond Dickinson (US) LLP

(57) ABSTRACT

A vehicle steering device comprises an upper tube having a steering shaft rotatably coupled to an inside thereof, a lower column having the upper tube inserted thereinto and having a recess formed in an outer surface of distance portions disposed to face each other with a cut hole axially formed in an outer circumference disposed therebetween, a mounting bracket coupled to respective outer surfaces of the distance portions and having tilt slots formed in two opposite sides thereof, a fixed gear member provided on an outer surface of one side of the mounting bracket and having a communication hole communicating with the tilt slot, and a movable gear member movably coupled to the fixed gear member and positioned in the recess through the communication hole and the tilt slot.

15 Claims, 6 Drawing Sheets

VEHICLE STEERING DEVICE

CROSS-REFERENCE TO RELATED APPLICATION

This application claims priority to Korean Patent Application No. 10-2023-0074146, filed on Jun. 9, 2023, which is hereby incorporated by reference for all purposes as if fully set forth herein.

BACKGROUND

Field

The present disclosure generally relates to a vehicle steering device. More specifically, some embodiments of the present disclosure relate to a vehicle steering device that allows a mounting bracket to remain in place while being prevented from rotating during the transportation process before the steering column and the vehicle are assembled, thereby preventing assembly defects and delays in assembly process as well as malfunctions due to misassembly while driving.

Description of Related Art

Typically, a vehicle steering column includes a mounting bracket for fixing an upper tube and a lower column that embed a steering shaft and are relatively slidable.

The vehicle steering column has restricting means may perform tilting for adjusting the fixing angle of a steering wheel and telescoping for adjusting a degree to which the steering wheel projects.

In the conventional vehicle steering column, however, the mounting bracket may fail to remain in place but may rather slightly rotate during the transportation process before being assembled in the vehicle due to dispersion of the locking and supporting force of the restricting means.

Further, due to such slight rotation of the mounting bracket, the assembly position with the vehicle may not remain securely, causing assembly defects and delays in assembly process.

BRIEF SUMMARY

Some embodiments of the present disclosure may provide a vehicle steering device that allows a mounting bracket to remain in place while being prevented from rotating during the transportation process before the steering column and the vehicle are assembled, thereby preventing assembly defects and delay in assembly process as well as malfunctions due to misassembly while driving.

In an aspect, the present embodiments may provide a vehicle steering device comprising an upper tube having a steering shaft rotatably coupled to an inside thereof, a lower column having the upper tube inserted thereinto and having a recess formed in an outer surface of distance portions disposed to face each other with a cut hole axially formed in an outer circumference disposed therebetween, a mounting bracket coupled to respective outer surfaces of the distance portions and having tilt slots formed in two opposite sides thereof, a fixing gear member provided on an outer surface of one side of the mounting bracket and having a communication hole communicating with the tilt slot, and a movable gear member coupled to the fixing gear member and positioned in the recess through the communication hole and the tilt slot.

Further, in the present embodiments, the movable gear member may include a gear coupling portion having movable gear teeth on two opposite sides of a surface facing the fixing gear member.

Further, the gear coupling portion may have a bolt through hole communicating with the tilt slot.

Further, in the present embodiments, the movable gear member may further include an extension support connected with the gear coupling portion, protruding toward the distance portions between the movable gear teeth, and having a hollow portion communicating with the bolt through hole.

Further, in the present embodiments, an end portion of the extension support may be positioned inside the recess.

Further, in the present embodiments, two opposite sides of an outer circumferential surface of the extension support may be spaced apart from an inner surface of the recess.

Further, in the present embodiments, one side of an outer circumferential surface of the extension support may be cut to communicate with the hollow portion.

Further, in the present embodiments, two opposite side surfaces of the recess may be formed as flat surfaces parallel to each other.

Further, in the present embodiments, two opposite sides of an outer circumferential surface of the extension support may be formed as flat surfaces parallel to the two opposite side surfaces of the recess.

Further, in the present embodiments, a gear block moving while supporting the movable gear member during tilting or telescoping may be coupled to an outside of the gear coupling portion.

Further, in the present embodiments, the gear block may include a gear support having a block hole communicating with the bolt through hole and disposed outside the gear coupling portion.

Further, in the present embodiments, the gear block may further include side supports extending from two opposite ends of the gear support to the movable gear member to support two opposite surfaces of the gear coupling portion.

Further, in the present embodiments, the gear block may further include bent supports bent inward from the side supports to face each other to support an inner surface of the gear coupling portion.

Further, in the present embodiments, a thrust bearing may be coupled to an outer surface of the gear block.

Further, in the present embodiments, the thrust bearing may be supported by a fastening member screwed to the adjust bolt.

According to certain embodiments of the present disclosure, there may be provided a vehicle steering device that allows a mounting bracket to remain in place while being prevented from rotating during the transportation process before the steering column and the vehicle are assembled, thereby preventing assembly defects and delays in assembly process as well as malfunctions due to misassembly while driving.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
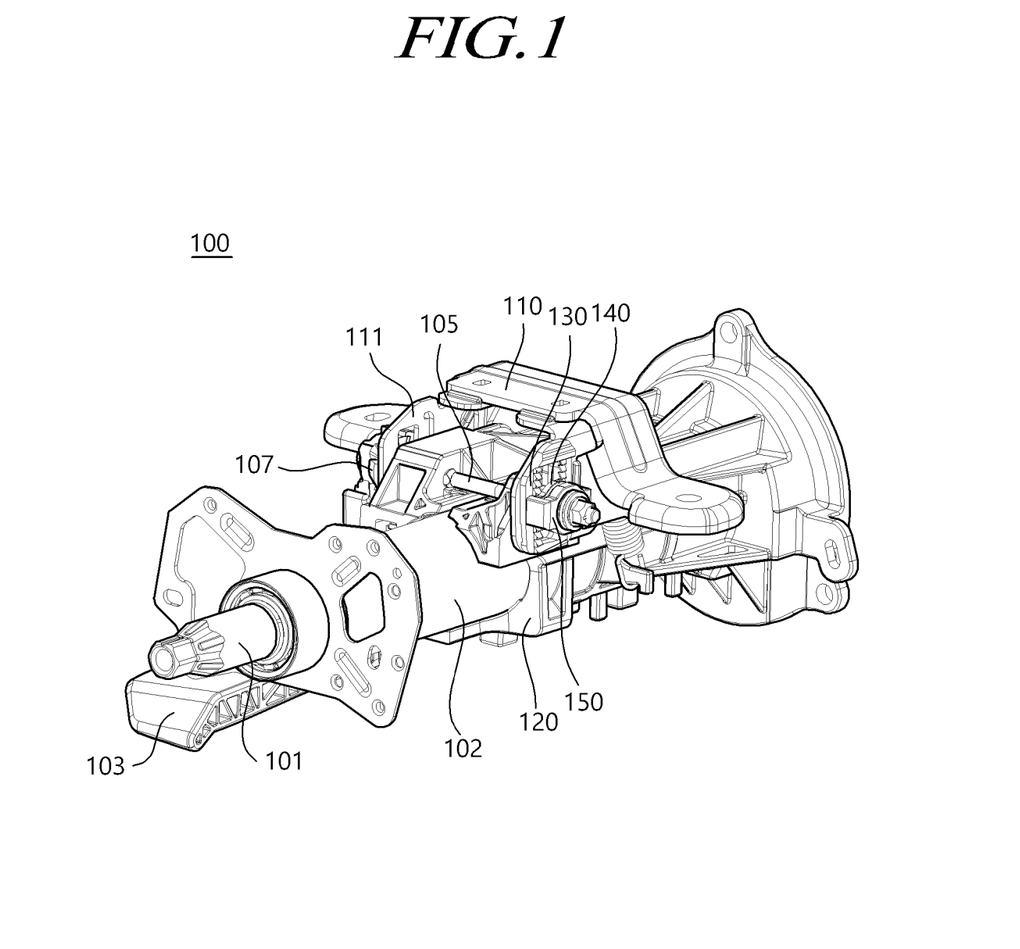
FIG. 1 is a perspective view illustrating a vehicle steering device according to an embodiment of the present disclosure.
Figure 2:
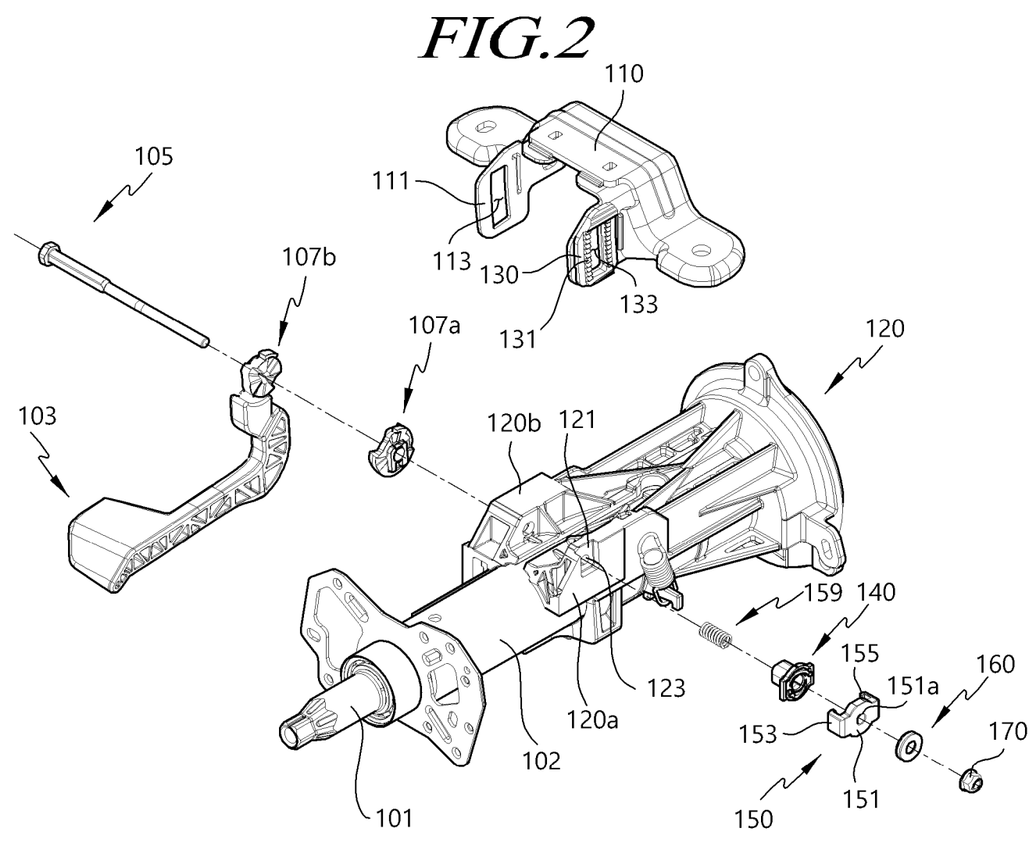
FIGS. 2 and 3 are perspective exploded views illustrating a portion of a vehicle steering device according to an embodiment of the present disclosure.
Figure 3:
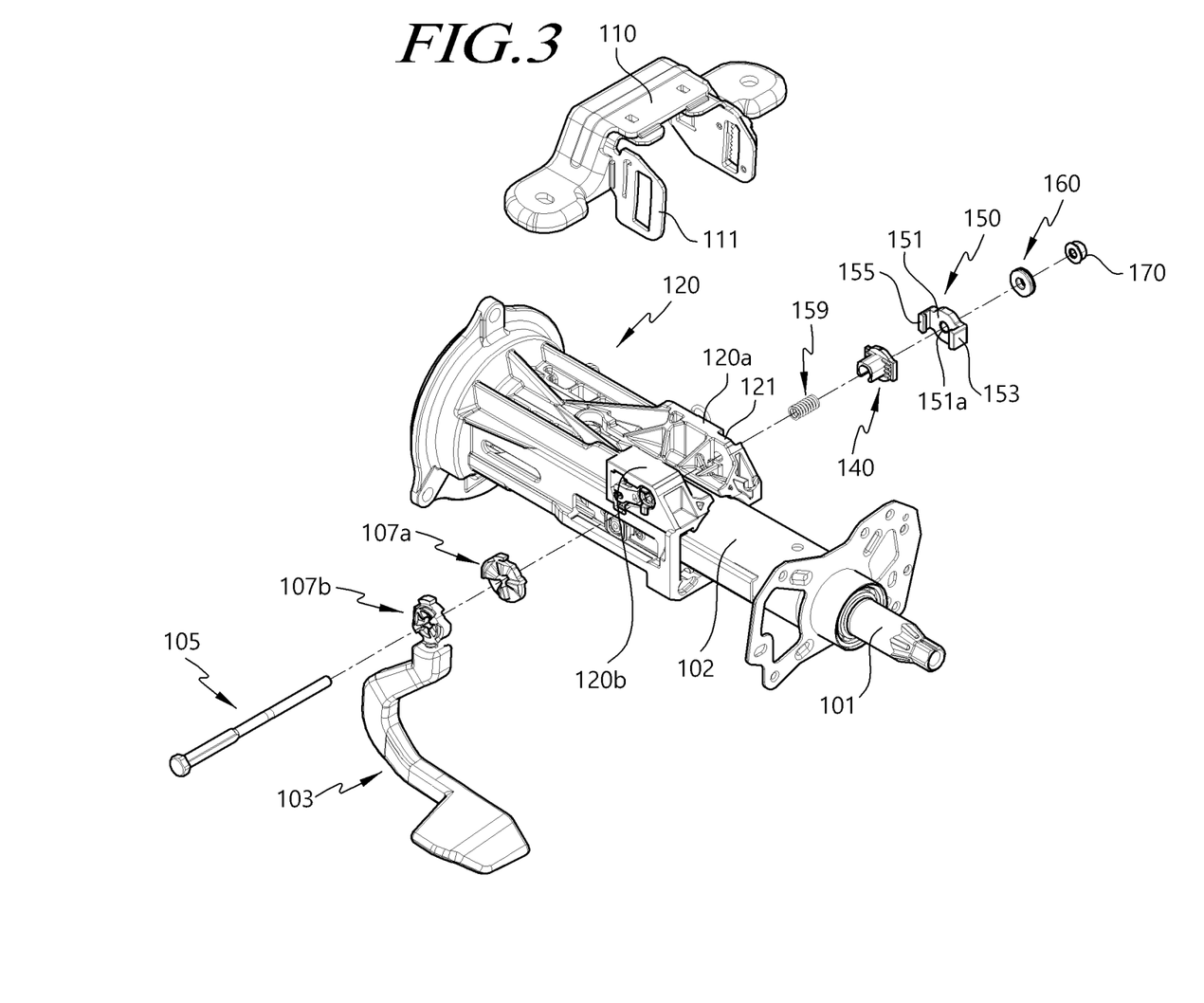
Figure 4:
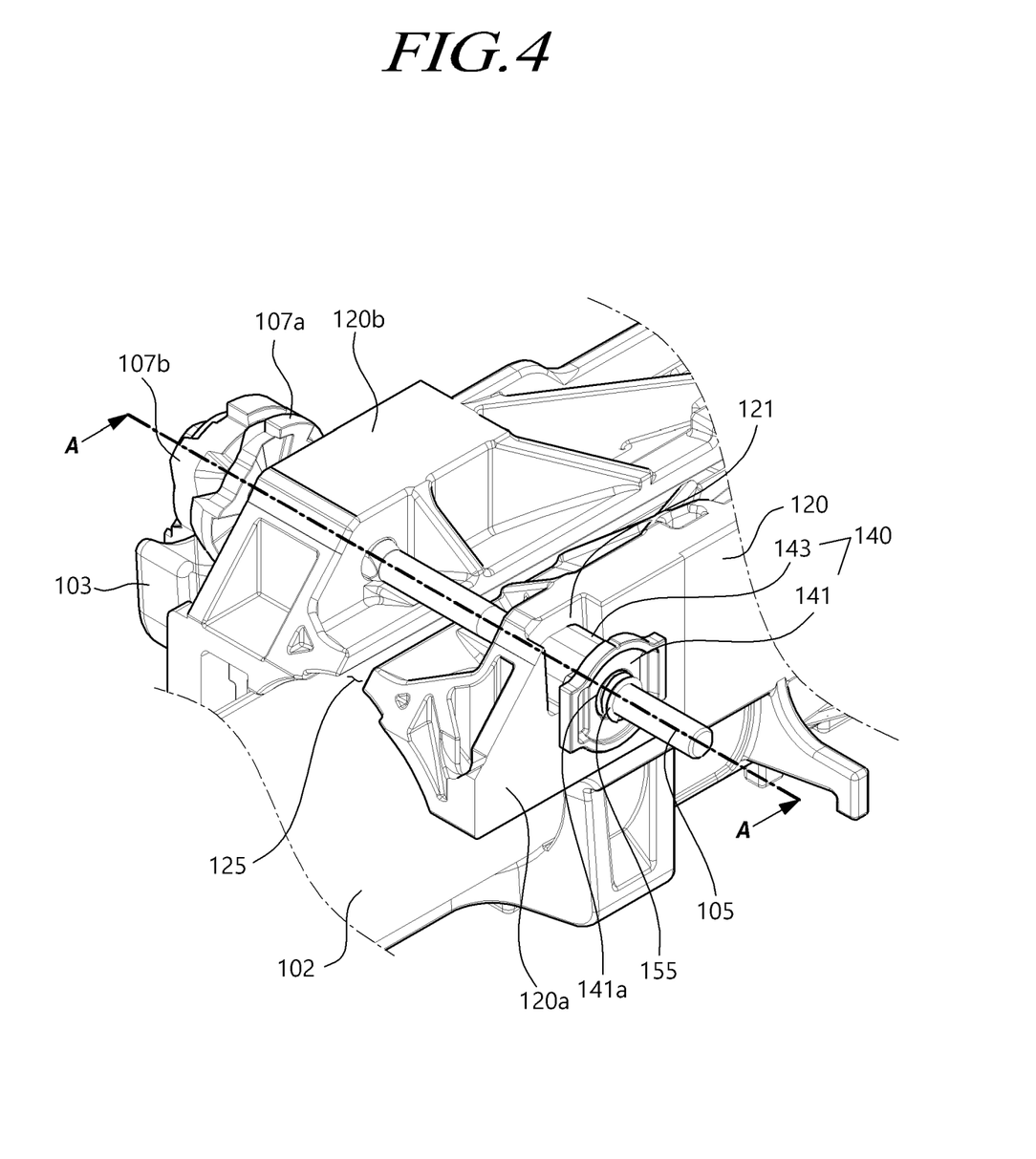
FIGS. 4 and 5 are partial perspective views illustrating a vehicle steering device according to an embodiment the present disclosure.
Figure 5:
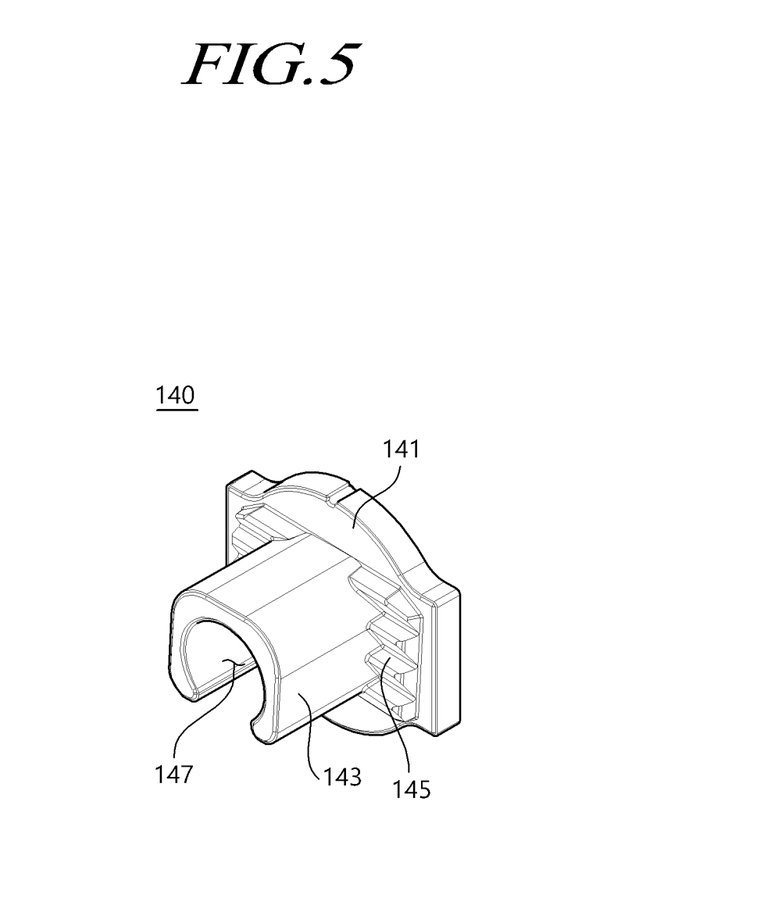
Figure 6:
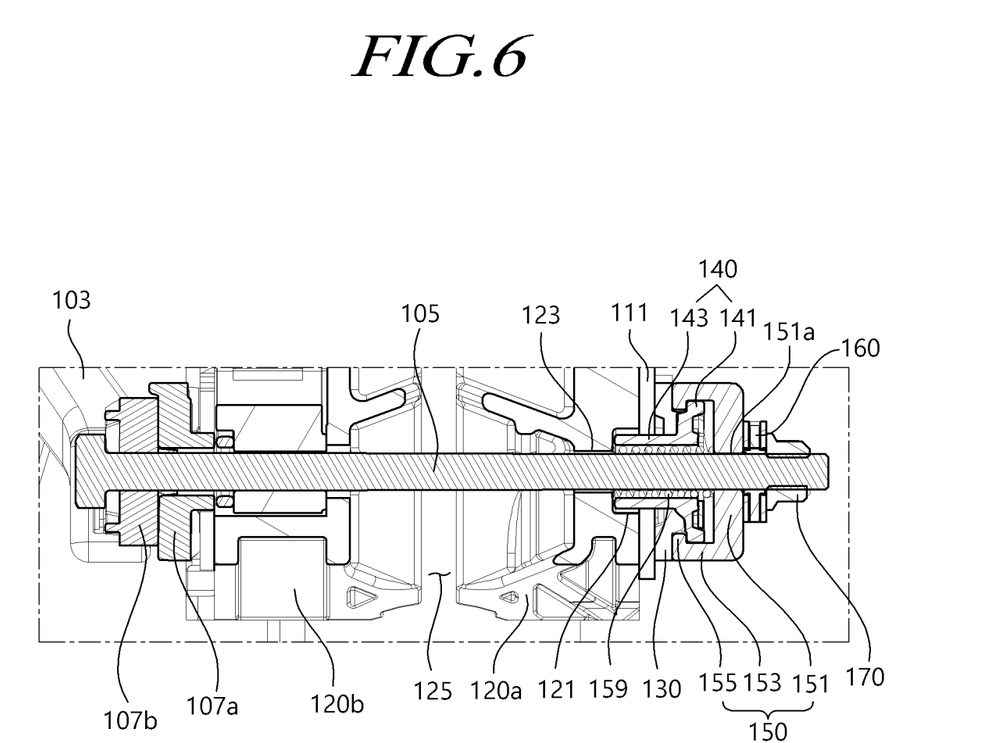
FIG. 6 is a cross-sectional view illustrating the vehicle steering device taken along line A of FIG. 4 according to an embodiment of the present disclosure.

FIG. 1 is a perspective view illustrating a vehicle steering device according to an embodiment of the present disclosure. FIGS. 2 and 3 are perspective exploded views illustrating a portion of a vehicle steering device according to an embodiment of the present disclosure. FIGS. 4 and 5 are partial perspective views illustrating a vehicle steering device according to an embodiment the present disclosure. FIG. 6 is a cross-sectional view illustrating the vehicle steering device taken along line A of FIG. 4 according to an embodiment of the present disclosure.

Referring to FIGS. 1 to 6, a vehicle steering device 100 according to an embodiment of the present disclosure includes an upper tube 102 having a steering shaft 101 rotatably coupled to an inside thereof, a lower column 120 having the upper column 102 inserted thereinto and having a recess 121 formed in an outer surface of distance portions 120*a* and 120*b* disposed to face each other with a cut hole 125 axially formed in an outer circumference disposed therebetween, a mounting bracket 110 coupled to respective outer surfaces of the distance portions 120*a* and 120*b* and having tilt slots 113 formed in two opposite sides thereof, a fixed gear member 130 provided on an outer surface of one side of the mounting bracket 110 and having a communication hole 133 communicating with the tilt slot 113, and a movable gear member 140 coupled to the fixed gear member 130 and positioned in the recess 121 through the communication hole 133 and the tilt slot 113.

The steering shaft 101 coupled with the steering wheel is rotatably coupled to the inside of the upper tube 102 via, for example, but not limited to, a bearing.

As the lower column 120 is coupled to the outer circumference of the upper tube 102 which is formed to have a cylindrical shape, the upper tube 102 is capable of telescoping in or out of the lower column 102 when the driver performs telescoping of the vehicle steering device 100.

The lower column 120 which is formed to have a hollow shape has the cut hole 125 axially formed in the outer circumference thereof, and the distance portions 120*a* and 120*b* are provided to face each other with the cut hole 125 disposed therebetween.

Accordingly, the distance portions 120*a* and 120*b* are contracted or relaxed in the length direction of an adjust bolt 105, which passes through the distance portions 120*a* and 120*b*, by restricting means coupled to two opposite ends of the adjust bolt 105 when the driver performs the telescoping of the vehicle steering device 100, the axial movement of the upper tube 102 can be selectively allowed or restricted.

Further, while the driver performs tilting, the restricting means pressurize or depressurize the mounting bracket 110 and the distance portions 120*a* and 120*b* in the length direction of the adjust bolt 105, allowing the upper tube 102 and the lower column 120 to perform the tilting.

The restricting means may include an adjustment lever 103, a pair of cam members 107*a* and 107*b*, a spring 159, a fixed gear member 130, a movable gear member 140, a gear block 150, a thrust bearing 160, and a fastener or fastening member 170 which are coupled to two opposite ends of the adjust bolt 105.

The recess 121 is formed on or in an outer surface of the distance portions 120*a* and 120*b*, so that the movable gear member 140 can be positioned in the recess 121 to fix the position of the mounting bracket 110.

The mounting bracket 110 coupled to the outer surfaces of the distance portions 120*a* and 120*b* has tilt slots 113 elongated in the upper or lower tilting directions, and the fixed gear member 130 engaged with the movable gear member 140 is provided on the outer surface of the mounting bracket 110.

Tilt brackets 111 may be coupled to, or integrally formed with, the mounting bracket 110, and the tilt slots 113 may be formed in the tilt brackets 111.

The fixed gear member 130 has the communication hole 133 communicating with, or at least partially aligned with, the tilt slot 113, so that the adjust bolt 105 is coupled with the movable gear member 140 through the tilt slot 113 and the communication hole 133. Fixed gear teeth 131 for being coupled with the movable gear member 140 are provided on two opposite sides of the tilt slot 113.

The movable gear member 140 may include a gear coupling portion 141 that has movable gear teeth 145 on two opposite sides of a surface of the movable gear member 140 facing the fixed gear member 130.

The gear coupling portion 141 has a bolt through hole 141a communicating or at least partially aligned with the tilt slot 113.

Further, the movable gear member 140 may include an extension support 143 that is connected with the gear coupling portion 141 and protrudes toward the distance portions 120a and 120b between the movable gear teeth 145. The movable gear member 140 may have a hollow portion communicating with the bolt through hole 141a.

The gear coupling portion 141 has a plate shape with a predetermined thickness and has the bolt through hole 141a formed in the center of the gear coupling portion 141 to communicate with the hollow portion 147, and is integrally connected with the extension support 143.

The extension support 143 protrudes from the gear coupling portion 141 and extends to the fixed gear member 130 and has the movable gear teeth 145 formed on two opposite sides thereof to be engaged with the fixed gear teeth 131.

An end portion of the extension support 143 is positioned inside the recess 121, and two opposite sides of the outer circumferential surface of the extension support 143 are spaced apart from inner surfaces of the recess 121 to prevent noise caused by contact between the movable gear member 140 and the recess 121 when the driver or user performs the tilting or telescoping of the vehicle steering device 100 or external force is applied to the vehicle steering device 100.

Further, one side of the outer circumferential surface of the extension support 143 has a cut portion to communicate with the hollow portion 147, thereby reducing the weight of the movable gear member 140 and saving costs.

Further, the two opposite surfaces in the axial direction of the recess 121 may be formed to be flat, and two opposite sides of the outer circumferential surface of the extension support 143 are formed to be flat and parallel to the two opposite surfaces of the recess 121 in the axial direction.

Accordingly, even when an external force is applied to the mounting bracket 110 while transporting the steering column 100 to be assembled to the vehicle, the mounting bracket 110 and the fixed gear member 130 may remain in place without rotation, thereby preventing assembly defects by the worker and reducing assembly processes.

Further, a gear block 150 that is movable while supporting the movable gear member 140 during the tilting or telescoping of the vehicle steering device 100 is coupled to the outside of the gear coupling portion 141.

Here, the gear block 150 may include a gear support 151 that has a block hole 151a communicating or at least partially aligned with the bolt through hole 141a and is disposed outside the gear coupling portion 141.

Further, the gear block 150 may further include side supports 153 that extend from two opposite ends of the gear support 151 toward the movable gear member 140 and may include bent supports 155 that are bent inward from the side supports 153 to face each other to support the inner surface of the gear coupling portion 141.

The gear support 151, the side supports 153, and the bent supports 155 of the gear block 150 are connected to surround the gear coupling portion 141 perpendicularly to each other and is coupled to restrict an axially movable distance of the movable gear member 140 when the adjust bolt 105 is locked and released.

The bent supports 155 support the inner surface of the gear coupling portion 141 to prevent the movable gear member 140 from escaping or falling off in the axial direction, and the side supports 153 is coupled while supporting the slide of the gear coupling portion 141.

A thrust bearing 160 is coupled to an outer surface of the gear block 150 to support rotation with the gear block 150 when the adjust bolt 105 rotates.

Here, the thrust bearing 160 is supported and fixed by a fastening member 170 screwed to the adjust bolt 105.

According to some embodiments of the present disclosure having such a shape and structure, there may be provided a vehicle steering device that allows the mounting bracket to remain in place while being prevented from rotating during the transportation process before the steering column and the vehicle are assembled, thereby preventing assembly defects and delays in assembly process as well as malfunctions due to misassembly while driving.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle steering device, comprising:
   an upper tube, wherein a steering shaft is rotatably coupled to an inside of the upper tube;
   a lower column, wherein the upper tube is inserted in the lower column and the lower column has a recess formed on an outer surface of distance portions of the lower column facing each other and having a cut portion formed in an axial direction of the lower column between the distance portions of the lower column;
   a mounting bracket coupled to the outer surface of the distance portions of the lower column and having tilt slots formed at opposite sides of the mounting bracket;
   a fixed gear member provided on an outer surface of one of the opposite sides of the mounting bracket and having a communication hole at least partially aligned with one of the tilt slots of the mounting bracket; and
   a movable gear member movably coupled to the fixed gear member of the mounting bracket and positioned in the recess of the lower column through the communication hole of the fixed gear member and the tilt slot of the mounting bracket.

2. The vehicle steering device of claim 1, wherein the movable gear member includes a gear coupling portion having movable gear teeth formed at opposite sides of a surface of the movable gear member facing the fixed gear member of the mounting bracket.

3. The vehicle steering device of claim 2, wherein the gear coupling portion of the movable gear member has a bolt through hole at least partially aligned with the one of the tilt slots of the mounting bracket.

4. The vehicle steering device of claim 3, wherein the movable gear member further includes an extension support protruding from the gear coupling portion of the movable gear member toward the distance portions of the mounting bracket between the movable gear teeth, and having a hollow portion communicating with the bolt through hole of the gear coupling portion of the movable gear member.

5. The vehicle steering device of claim 4, wherein an end portion of the extension support of the movable gear member is positioned in the recess of the lower column.

6. The vehicle steering device of claim 4, wherein opposite sides of an outer circumferential surface of the extension support of the movable gear member are spaced apart from an inner surface of the recess of the lower column.

7. The vehicle steering device of claim 4, wherein one side of an outer circumferential surface of the extension support of the movable gear member has a cut portion configured to communicate with the hollow portion of the movable gear member.

8. The vehicle steering device of claim 4, wherein opposite side surfaces of the recess of the lower column have flat surfaces parallel to each other.

9. The vehicle steering device of claim 8, wherein opposite sides of an outer circumferential surface of the extension support of the movable gear member have flat surfaces parallel to the opposite side surfaces of the recess of the lower column.

10. The vehicle steering device of claim 4, wherein a gear block configured to be movable and support the movable gear member during tilting or telescoping of the vehicle steering device is coupled to an outside of the gear coupling portion of the movable gear member.

11. The vehicle steering device of claim 10, wherein the gear block includes a gear support having a block hole at least partially aligned with the bolt through hole of the gear coupling portion of the movable gear member and disposed outside the gear coupling portion of the movable gear member.

12. The vehicle steering device of claim 11, wherein the gear block further includes side supports extending from opposite ends of the gear support toward the movable gear member to support opposite surfaces of the gear coupling portion of the movable gear member.

13. The vehicle steering device of claim 12, wherein the gear block further includes bent supports bent inward from the side supports to face each other to support an inner surface of the gear coupling portion of the movable gear member.

14. The vehicle steering device of claim 10, wherein a thrust bearing is coupled to an outer surface of the gear block coupled to the outside of the gear coupling portion of the movable gear member.

15. The vehicle steering device of claim 8, wherein the thrust bearing is supported by a fastener screwed to an adjust bolt.

\* \* \* \* \*